(12) United States Patent
Suzuki et al.

(10) Patent No.: US 9,679,217 B2
(45) Date of Patent: Jun. 13, 2017

(54) INFORMATION PROCESSING APPARATUS, INFORMATION PROCESSING SYSTEM, INFORMATION PROCESSING METHOD AND STORAGE MEDIUM

(71) Applicant: KABUSHIKI KAISHA TOSHIBA, Minato-ku, Tokyo (JP)

(72) Inventors: Kaoru Suzuki, Yokohama Kanagawa (JP); Yojiro Tonouchi, Inagi Tokyo (JP); Tomoyuki Shibata, Kawasaki Kanagawa (JP); Isao Mihara, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 14/834,792

(22) Filed: Aug. 25, 2015

(65) Prior Publication Data

US 2016/0063340 A1 Mar. 3, 2016

(30) Foreign Application Priority Data

Aug. 26, 2014 (JP) .................. 2014-171848

(51) Int. Cl.
*G06K 9/34* (2006.01)
*G06K 9/00* (2006.01)
(Continued)

(52) U.S. Cl.
CPC ......... *G06K 9/3258* (2013.01); *G06K 9/3275* (2013.01); *G06K 9/6814* (2013.01);
(Continued)

(58) Field of Classification Search
CPC ...... G06K 9/325; G06K 9/78; G06K 2209/01; G06K 9/3258; G06K 9/3283; G06K 9/363; G06K 9/3275; G06T 7/004; G06T 7/60
(Continued)

(56) References Cited

U.S. PATENT DOCUMENTS 5,410,611 A * 4/1995 Huttenlocher ........... G06K 9/32
382/177
5,557,689 A * 9/1996 Huttenlocher ..... G06K 9/00859
382/174

(Continued)

FOREIGN PATENT DOCUMENTS

JP 05-054186 3/1993
JP 05-159099 6/1993

(Continued)

OTHER PUBLICATIONS

Pan, Yi-Feng, et al. "A Hybrid Approach to Detect and Localize Texts in Natural Scene Images", IEEE Transactions of Image Processing, vol. 20. No. 3, Mar. 2011, pp. 800-813, 14 pgs.

(Continued)

*Primary Examiner* — Kanjibhai Patel
(74) *Attorney, Agent, or Firm* — Knobbe, Martens, Olson & Bear, LLP

(57) ABSTRACT

According to one embodiment, an information processing apparatus includes an image acquisition module, an elevation-angle acquisition module, a character deformation specification module, a character detection dictionary storage, a character detection dictionary selector and a character detector. The elevation-angle acquisition module is configured to acquire an elevation angle of a photographic device assumed when the photographic device has obtained an acquired image. The character deformation specification module is configured to specify how an appearance of the character in the acquired image is deformed, based on the acquired elevation angle.

5 Claims, 14 Drawing Sheets

Appearance of character string that varies depending upon angle of viewing

(51) Int. Cl.
*G06K 9/20* (2006.01)
*G06K 9/32* (2006.01)
*G06K 9/68* (2006.01)
*G06T 7/60* (2017.01)
*G06K 9/36* (2006.01)

(52) U.S. Cl.
CPC .......... *G06T 7/60* (2013.01); *G06K 2009/363* (2013.01); *G06K 2209/01* (2013.01)

(58) Field of Classification Search
USPC ........................................ 382/177, 181, 321
See application file for complete search history.

(56) References Cited

U.S. PATENT DOCUMENTS

| | | | | |
|---|---|---|---|---|
| 5,687,253 | A * | 11/1997 | Huttenlocher | G06K 9/6206 382/177 |
| 5,949,906 | A * | 9/1999 | Hontani | G06K 9/00442 382/177 |
| 6,188,790 | B1 * | 2/2001 | Yoshikawa | G06K 9/42 382/177 |
| 6,330,358 | B1 * | 12/2001 | Nagaishi | G06K 9/342 382/178 |
| 7,221,399 | B2 | 5/2007 | Fujita | |
| 7,965,904 | B2 | 6/2011 | Kobayashi | |
| 8,139,862 | B2 | 3/2012 | Shimodaira | |
| 2003/0086615 | A1 * | 5/2003 | Dance | G06K 9/00456 382/200 |
| 2006/0120629 | A1 * | 6/2006 | Myers | G06K 9/3258 382/321 |
| 2009/0238494 | A1 | 9/2009 | Ochi et al. | |
| 2009/0309892 | A1 * | 12/2009 | Uehori | G09G 5/346 345/581 |
| 2010/0141758 | A1 | 6/2010 | Kim et al. | |

FOREIGN PATENT DOCUMENTS

| | | |
|---|---|---|
| JP | 05-189691 | 7/1993 |
| JP | 05-258118 | 10/1993 |
| JP | 05-258119 | 10/1993 |
| JP | 06-044405 | 2/1994 |
| JP | 06-245032 | 9/1994 |
| JP | 07-085215 | 3/1995 |
| JP | 07-093476 | 4/1995 |
| JP | 07-105310 | 4/1995 |
| JP | 07-152857 | 6/1995 |
| JP | 07-182459 | 7/1995 |
| JP | 08-190610 | 7/1996 |
| JP | 08-194776 | 7/1996 |
| JP | 08-315067 | 11/1996 |
| JP | 11-203404 | 7/1999 |
| JP | 11-272801 | 10/1999 |
| JP | 2000-030052 | 1/2000 |
| JP | 2000-181988 | 6/2000 |
| JP | 2001-307017 | 11/2001 |
| JP | 2001-331803 | 11/2001 |
| JP | 2002-117373 | 4/2002 |
| JP | 2002-123825 | 4/2002 |
| JP | 2002-207963 | 7/2002 |
| JP | 2005-055969 | 3/2005 |
| JP | 3677666 | 8/2005 |
| JP | 2006-172083 | 6/2006 |
| JP | 3891981 | 3/2007 |
| JP | 2008-039611 | 2/2008 |
| JP | 2008-097588 | 4/2008 |
| JP | 2008-123245 | 5/2008 |
| JP | 2008-234160 | 10/2008 |
| JP | 4164568 | 10/2008 |
| JP | 2008-287517 | 11/2008 |
| JP | 2009-230411 | 10/2009 |
| JP | 2010-231686 | 10/2010 |
| JP | 2012-221372 | 11/2012 |
| JP | 2013-246677 | 12/2013 |
| JP | 2016-045877 | 4/2016 |

OTHER PUBLICATIONS

U.S. Appl. No. 15/058,542, filed Mar. 2, 2016, Suzuki et al.
U.S. Appl. No. 15/060,151, filed Mar. 3, 2016, Suzuki et al.
"Word Lens", Wikipedia, the free encyclopedia, https://en.wikipedia.org/wiki/Word_Lens, Jun. 2, 2015.

* cited by examiner

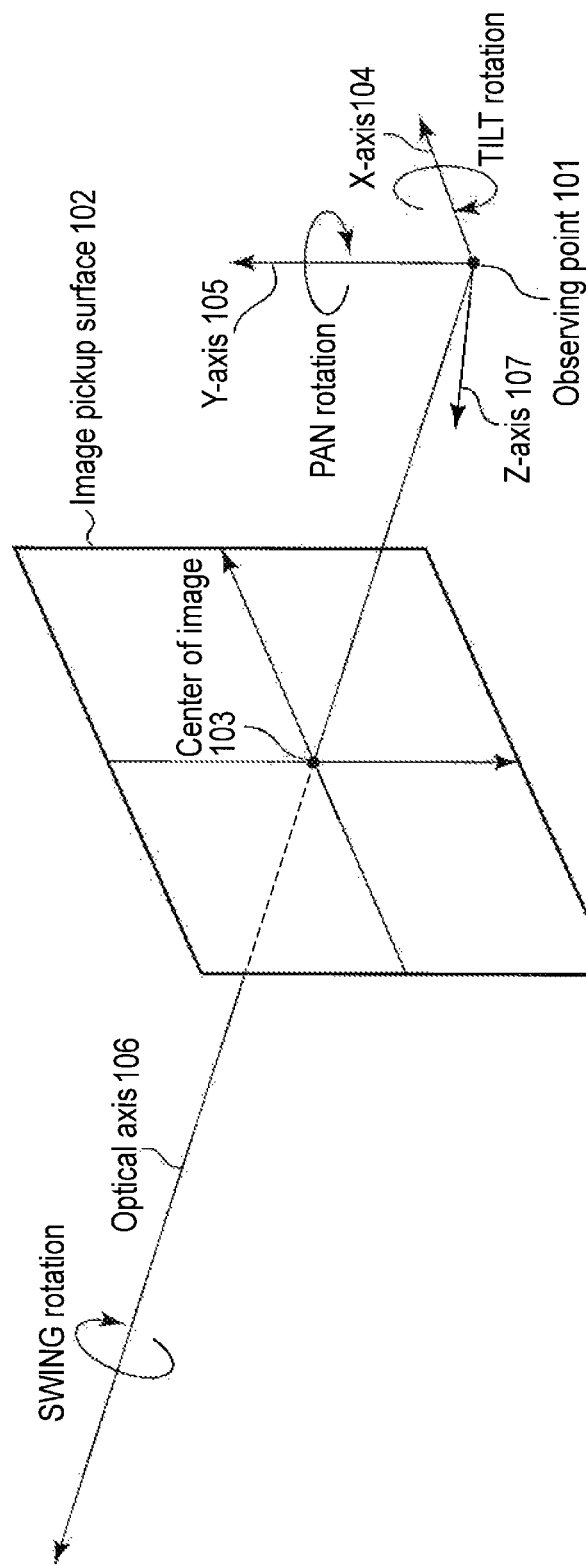
F I G. 2

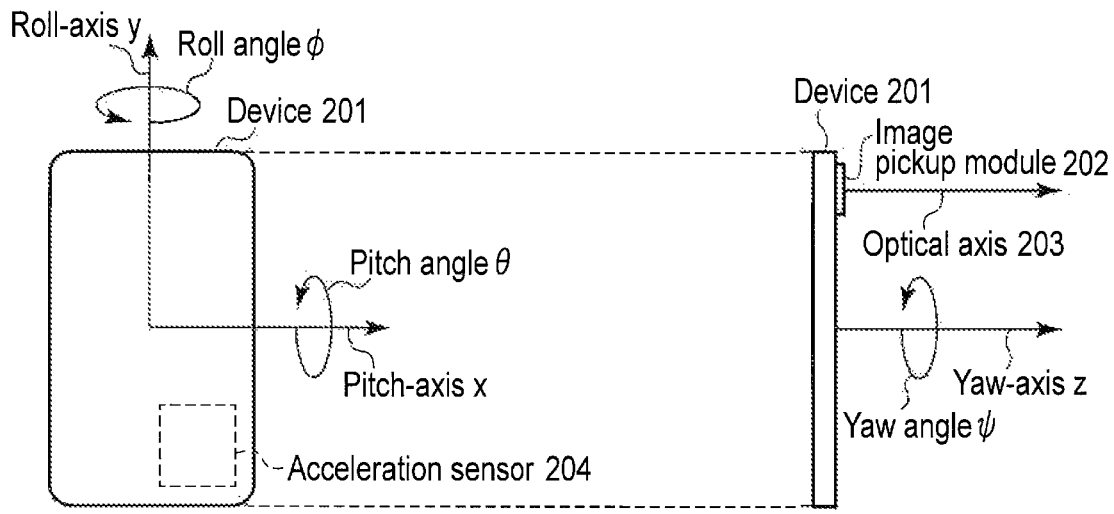
F I G. 4
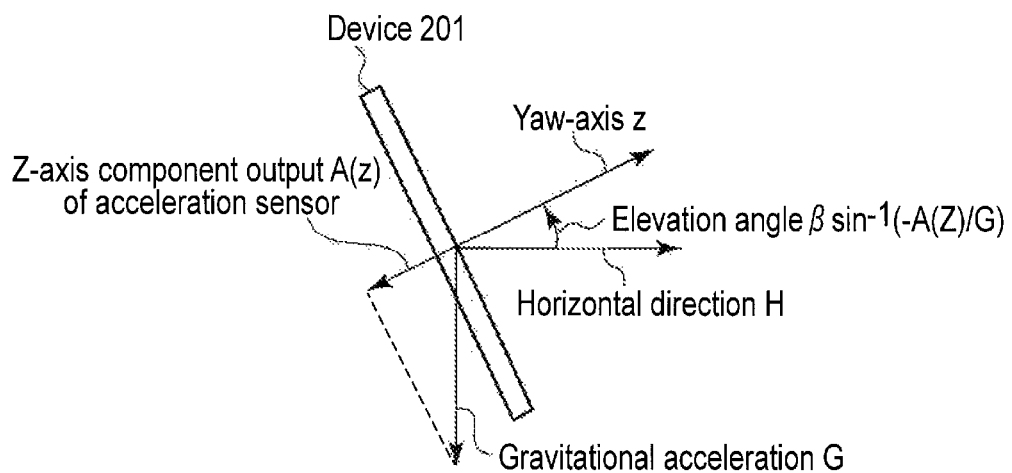
F I G. 5

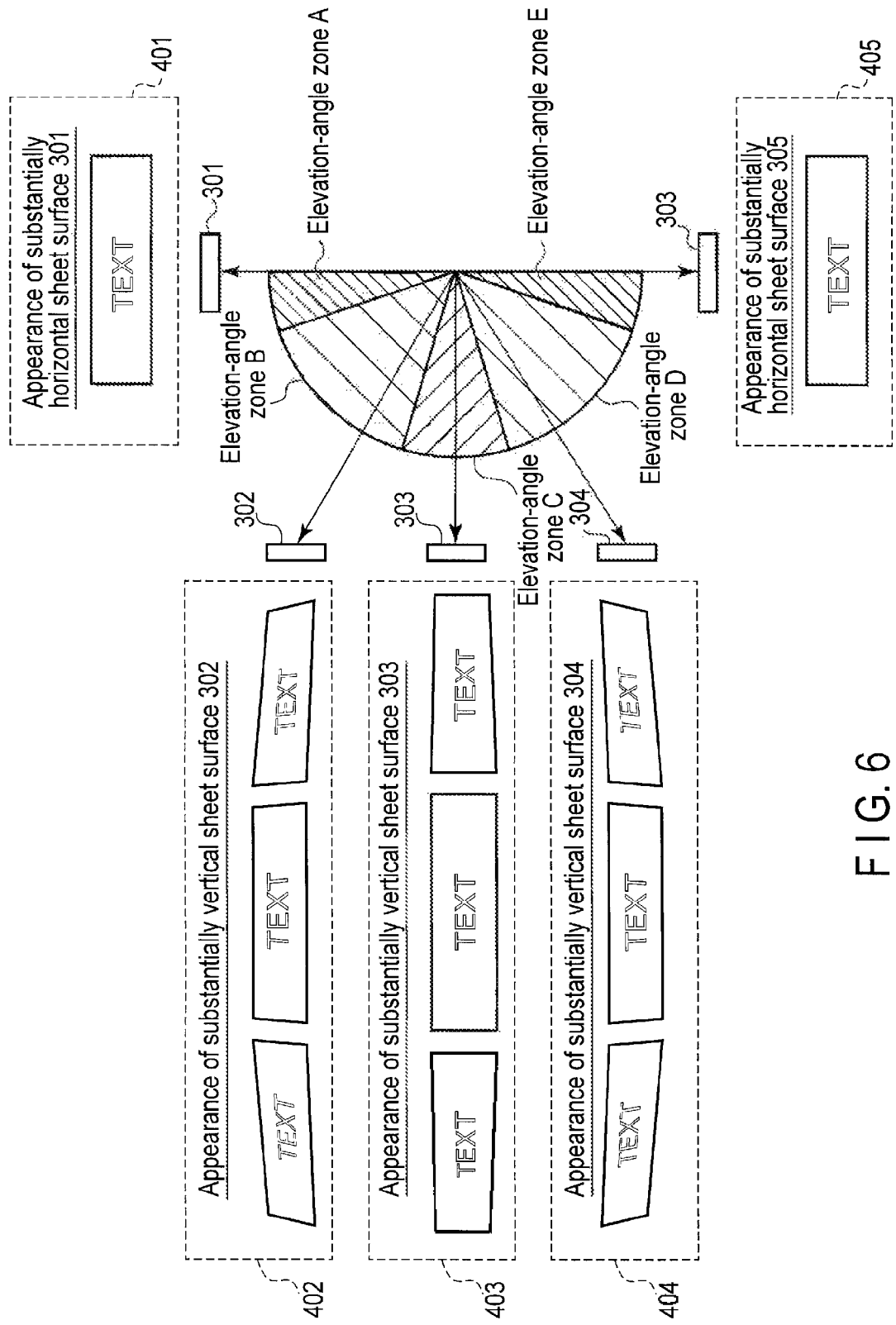
F I G. 6

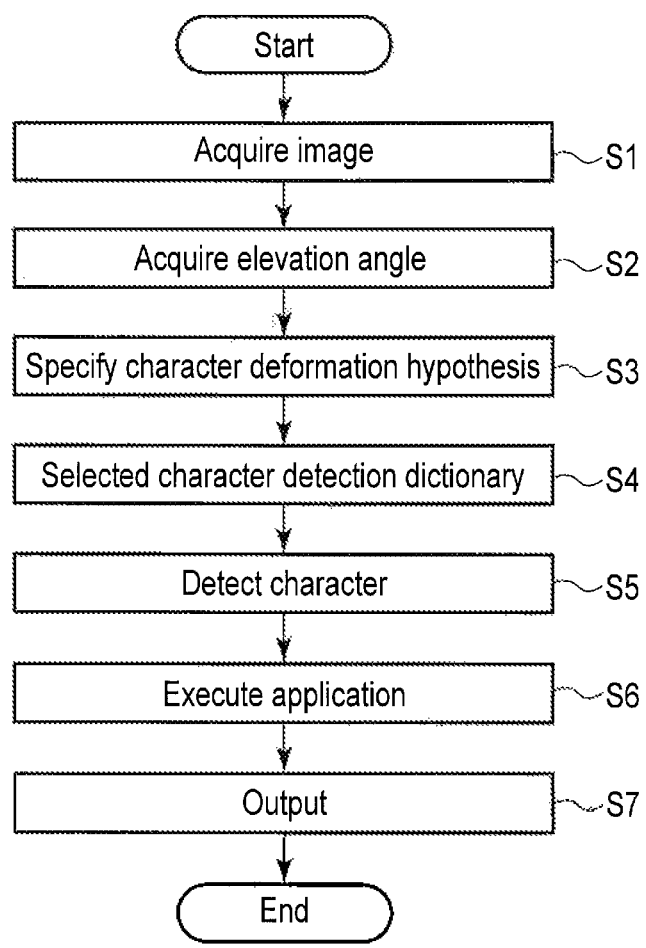
F I G. 10

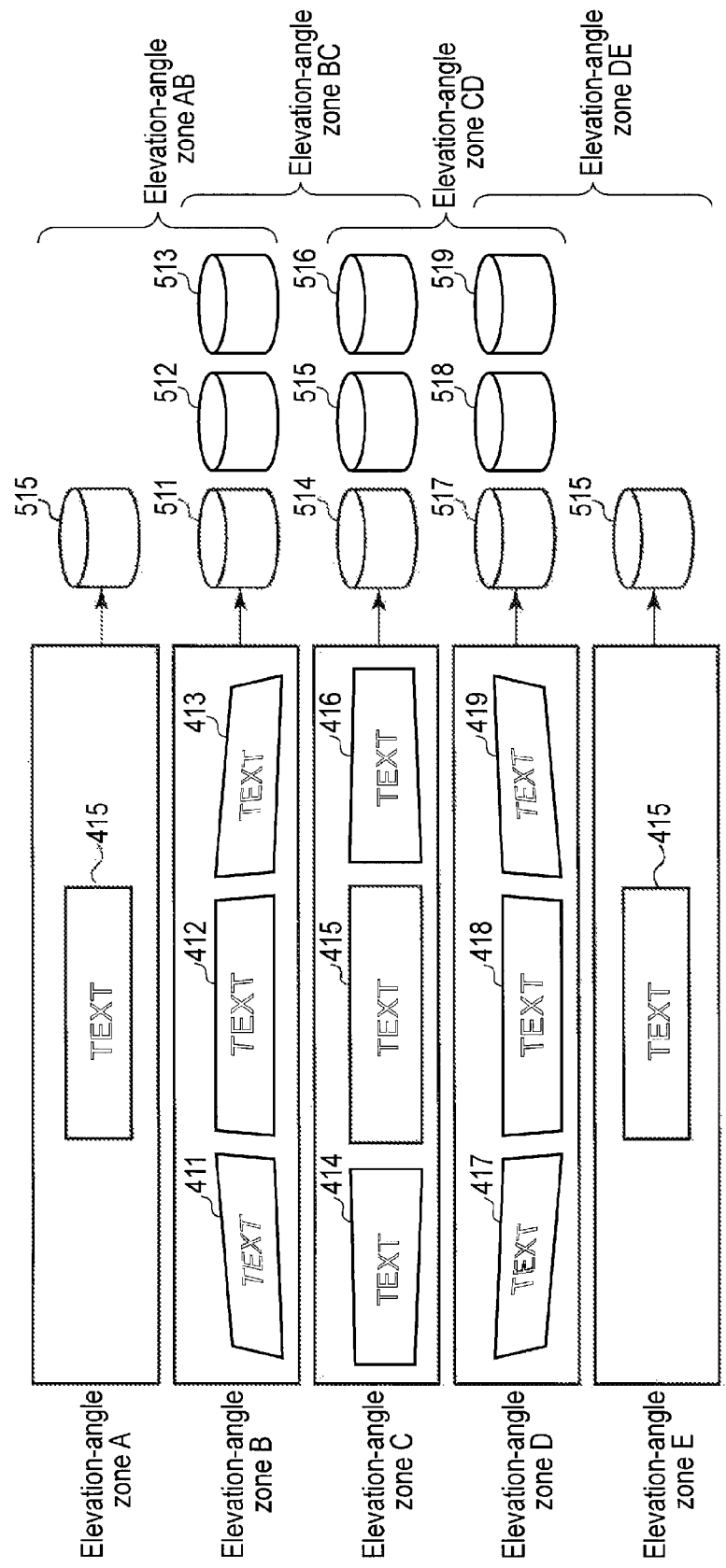
F I G. 16

INFORMATION PROCESSING APPARATUS, INFORMATION PROCESSING SYSTEM, INFORMATION PROCESSING METHOD AND STORAGE MEDIUM

CROSS-REFERENCE TO RELATED APPLICATIONS

This application is based upon and claims the benefit of priority from Japanese Patent Application No. 2014-171848, filed Aug. 26, 2014, the entire contents of which are incorporated herein by reference.

FIELD

Embodiments described herein relate generally to an information processing apparatus, an information processing system, a information processing method and storage medium.

BACKGROUND

In general, when a character written on a signboard, an indicator, a paper sheet, etc, is extracted from an image obtained by photography using a camera, an inconvenience as below will arise. Namely, a character in an image exhibits various deformed appearances (because of, for example, deformation due to projection), depending upon the positional relationship between a sheet surface printed with the character and the point of view of the camera. Therefore, it is difficult to reliably extract the character from the image.

In order to reliably extract a character from an image, a character detection method has been developed, in which a frame around the character is firstly detected, then an image where the detected frame is corrected to a non-deformed state is generated, and a non-deformed character is detected in the generated image.

In this character detection method, the character must be written within a known frame. If the character is written in a frame of an unknown shape, it cannot reliably be extracted from the image.

BRIEF DESCRIPTION OF THE DRAWINGS

FIG. 2 is a schematic view showing three-dimensional rotation of a camera.

FIG. 4 is a view for explaining a method of calculating an angle of elevation.

FIG. 5 is another view for explaining the method of calculating an angle of elevation.

FIG. 6 is a view showing the relationship between an elevation-angle zone and a character deformation hypothesis according to the embodiment.

FIG. 10 is a flowchart showing an operation example of the information processing apparatus of the embodiment.

FIG. 16 is a view for explaining yet another deformation of the information processing apparatus of the embodiment.

DETAILED DESCRIPTION

An embodiment will be described with reference to the accompanying drawings.

In general, according to one embodiment, an information processing apparatus includes an image acquisition module, an elevation-angle acquisition module, a character deformation specification module, a character detection dictionary storage, a character detection dictionary selector and a character detector. The image acquisition module is configured to acquire an image obtained by photographing a sheet surface printed with a character. The elevation-angle acquisition module is configured to acquire an elevation angle of a photographic device assumed when the photographic device has obtained the acquired image. The character deformation specification module is configured to specify how an appearance of the character in the acquired image is deformed, based on the acquired elevation angle. The character detection dictionary storage is configured to store a plurality of character detection dictionaries associated with variously deformed appearances of the character. The character detection dictionary selector is configured to select, after the character deformation specification module specifies how the appearance of the character is deformed, one of the character detection dictionaries from the character detection dictionary storage, the one character detection dictionary being associated with the specified appearance of the character. The character detector is configured to execute character detection processing on the acquired image to detect an area of the character in the acquired image, using the selected character detection dictionary.

Firstly, a description will be given of a problem that will occur when a character string written on a signboard, an indicator or a paper sheet (for example, a menu in a restaurant) is detected in an image (visual scene image) of the signboard, indicator or paper sheet obtained by photography using a camera. The problem lies in that the character string may not reliably be extracted from the image because of various deformations of appearance of the character string due to the positional relationship between a sheet surface printed with the character string and the point of view of the camera. The appearance of a character varies in various manners as shown in, for example, FIG. 1.

Figure 1:
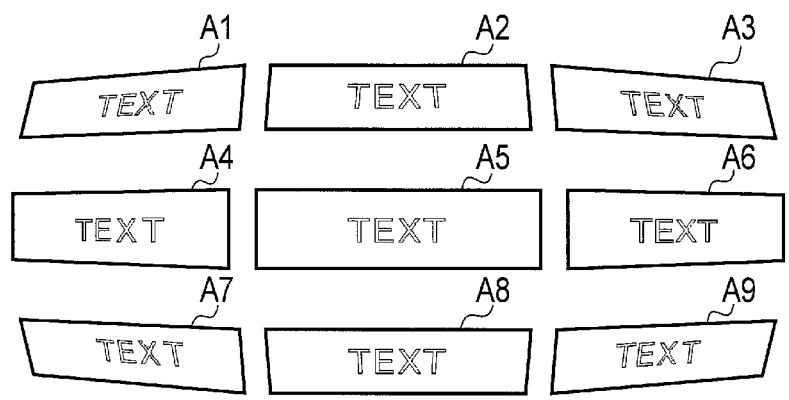
FIG. 1 is a view for explaining various appearances of a character obtained when the angle of view is changed.

FIG. 1 is a view for explaining a diversity of appearances of a character string that occurs depending upon the angle of view. An appearance A1 is an appearance of the character string obtained when a sheet surface printed with a character string "TEXT" was photographed from diagonally rightward below. Further, an appearance A5 is an appearance of the character string obtained when the sheet surface printed with the character string "TEXT" was photographed from the front. Similarly, an appearance A9 is an appearance of the character string obtained when the sheet surface printed with the character string "TEXT" was photographed from diagonally leftward above, The other appearances A2 to A4 and A6 to A8 are similar appearances of the character string "TEXT" obtained from various directions.

As shown in FIG. 1, even the same character string "TEXT" exhibits various deformed appearances, depending upon the positional relationship between the sheet surface printed with the character string and the point of view of the camera having photographed the sheet surface. Thus, the above-mentioned problem that a character (string) cannot reliably be extracted from an image thereof will arise.

To overcome the problem, various character detection methods for reliably detecting a character in an image have been proposed.

For example, there is a character detection method of detecting, in an image, the frame of a sheet surface printed with a character (string), then generating a corrected image where the detected frame is corrected to a state with no deformations, and extracting a non-deformed character from the corrected image.

More specifically, the character detection method has been proposed, in which a tetragon formed by two pairs of parallel lines is extracted as the above-mentioned frame from horizontal and vertical edges, and an image wherein deformation of the frame is corrected is generated from the coordinates of the four verticies of the tetragon, thereby detecting a non-deformed character from the corrected image.

There is another character detection method. In this method, a predetermined area, in which a character (string) is written, is extracted as a frame from an image by area division and integration based on colors, and an image having its frame deformation corrected based on a contour linear line of the predetermined area is generated, thereby detecting a non-deformed character from the corrected image.

However, the above-mentioned character detection methods are inconvenient in that it is supposed that a character (string) is written in a frame or box of a known shape, and that a character written in a frame of an unknown shape or in a sheet surface having no frames cannot reliably be extracted from an image thereof.

In light of the above, a character detection method has been developed, in which a character is extracted from a non-corrected image without extracting a frame, using a universal dictionary that stores various backgrounds and can suggest characters deformed in various ways.

In this method, however, since such a universal dictionary as stores various backgrounds and can suggest characters deformed in various ways is used, checking accuracy is rather reduced because of too many character candidates, with the result that erroneous detection will easily occur.

In light of the above, there is a character detection method, in which dictionaries are prepared for respective types of appearances and deformations of characters, and an input image is checked using all dictionaries to detect a character (string). This method, however, is inconvenient in that since all dictionaries are used for checking, too much time is required for character detection processing.

As described above, the general character detection methods of detecting a character in an image cannot solve all problems, such as limitation on the types of frames, reduction of the collation accuracy of a dictionary, and excess collation time. The embodiment proposes an information processing apparatus capable of solving those problems and achieving processing of reliably extracting a character from an image.

The configuration of an information processing apparatus 10 according to the embodiment will now be described. Before the description of the apparatus, however, a brief description will be given of a precondition associated with the attitude of a camera and to be considered before execution of the character detection processing, by the information processing apparatus 10, of detecting a character in an image.

A device (hereinafter, also referred to simply as "a camera") having a camera function can be generally rotated three-dimensionally by a user (a photographer, a user). Namely, the user can three-dimensionally orient the camera vertically, horizontally and obliquely. FIG. 2 is a schematic view showing the three-dimensional rotation of the camera. In FIG. 2, reference number 101 denotes the observation point of the camera, and reference number 102 denotes the image-pickup surface of the camera. The center of the image-pickup surface 102 serves as an image center 103. A coordinate axis extending through the observation point 101 of the camera horizontally with respect to the ground is an x-axis 104. A coordinate axis extending through the observation point 101 of the camera vertically with respect to the ground is a y-axis 105. Further, when a z-axis 107 perpendicular to the x- and y-axes 104 and 105 is provided, it also extends horizontally with respect to the ground. In other words, an x-z plane formed between the x-axis 104 and the z-axis 107 is horizontal with respect to the ground, and the y-z plane formed between the y-axis 105 and the z-axis 107 is perpendicular to the ground.

An axis extending along a normal line between the camera observation point 101 and the image-pickup surface 102 (namely, an axis along which a line segment connecting the camera observation point 101 to the image center 103 extends) is the optical axis 106 of the camera. Assume here that the optical axis 106 always exists in the y-z plane. The camera attitude is the three-dimensional attitude of the image-pickup surface 102, and is expressed by rotational angles set about the y-axis 105, the x-axis 104 and the optical axis 106 in this order, using the observation point 101 of the camera as the center.

The rotational angle about the y-axis is called "a pan rotational angle" because it is associated with a pan rotation (PAN rotation) for changing the orientation of the camera in the horizontal plane. Assume here that by the pan rotation, the x-axis 104 and the z-axis 107 are rotated horizontally, in other words, the x-z plane is rotated horizontally. In accordance with the rotation of the x-z plane, the y-z plane including the optical axis 106 is also horizontally rotated. Namely, the pan rotation changes the horizontal orientation of the optical axis 106 (i.e., the image-pickup surface 102).

On the other hand, the rotational angle about the x-axis is also called "a tilt rotational angle" because it is associated with a tilt rotation (TILT rotation) for changing the orientation of the camera in the vertical plane. The optical axis 106 rotates within the y-z plane by the tilt rotation. Namely, the tilt rotation changes the vertical orientation of the optical axis 106 (i.e., the image-pickup surface 102). At this time, the angle formed in the y-z plane by the optical axis 106 and the z-axis 107 is defined as an angle of elevation. It is assumed that if the optical axis 106 coincides with the z-axis 107, the angle of elevation is zero, if the optical axis 106 is oriented above the z-axis 107, the angle of elevation is positive, and if the optical axis 106 is oriented below the z-axis 107, the angle of elevation is negative.

Furthermore, the angle of rotation about the optical axis 106 is called "a swing rotational angle" since it is associated with a swing rotation for rotating an image on the image-pickup surface 102 about the image center 103. Thus, the camera attitude (the attitude of the image-pickup surface 102) is represented by the pan rotational angle, the tilt rotational angle and the swing rotational angle. The tilt rotational angle corresponds to the angle of elevation.

In the embodiment, it is assumed that two preconditions exist in association with the attitude of the camera (i.e., in association with photographing acts of a user).

(Precondition 1) It is assumed that if the user aims their camera at a target of photography to thereby orient the camera obliquely upward or downward, or forward (in other words, the tilt rotational angle [the angle of elevation] falls within, for example, a range of −80° to +80°), the camera finds a sheet surface (such as a signboard or indicator surface) printed with a character (string) and opposed substantially perpendicularly to the ground. Similarly, if the camera is oriented just above or below (in other words, the tilt rotational angle [the angle of elevation] falls within, for example, a range of +80° to +90° or of −90° to −80°), the camera finds a sheet surface (such as a paper sheet on a ceiling or on a desk) printed with a character (string) and opposed substantially parallel to the ground.

(Precondition 2) It is assumed that the user aims the camera at a target only by controlling the tilt rotation and the pan rotation (in other words, only by changing the tilt rotational angle and the pan rotational angle). Namely, it is assumed that the user substantially does not perform the swing rotation to, for example, obliquely orient the camera toward the target.

The information processing apparatus 10 of the embodiment executes character detection processing in consideration of the above-mentioned two preconditions.

Figure 3:
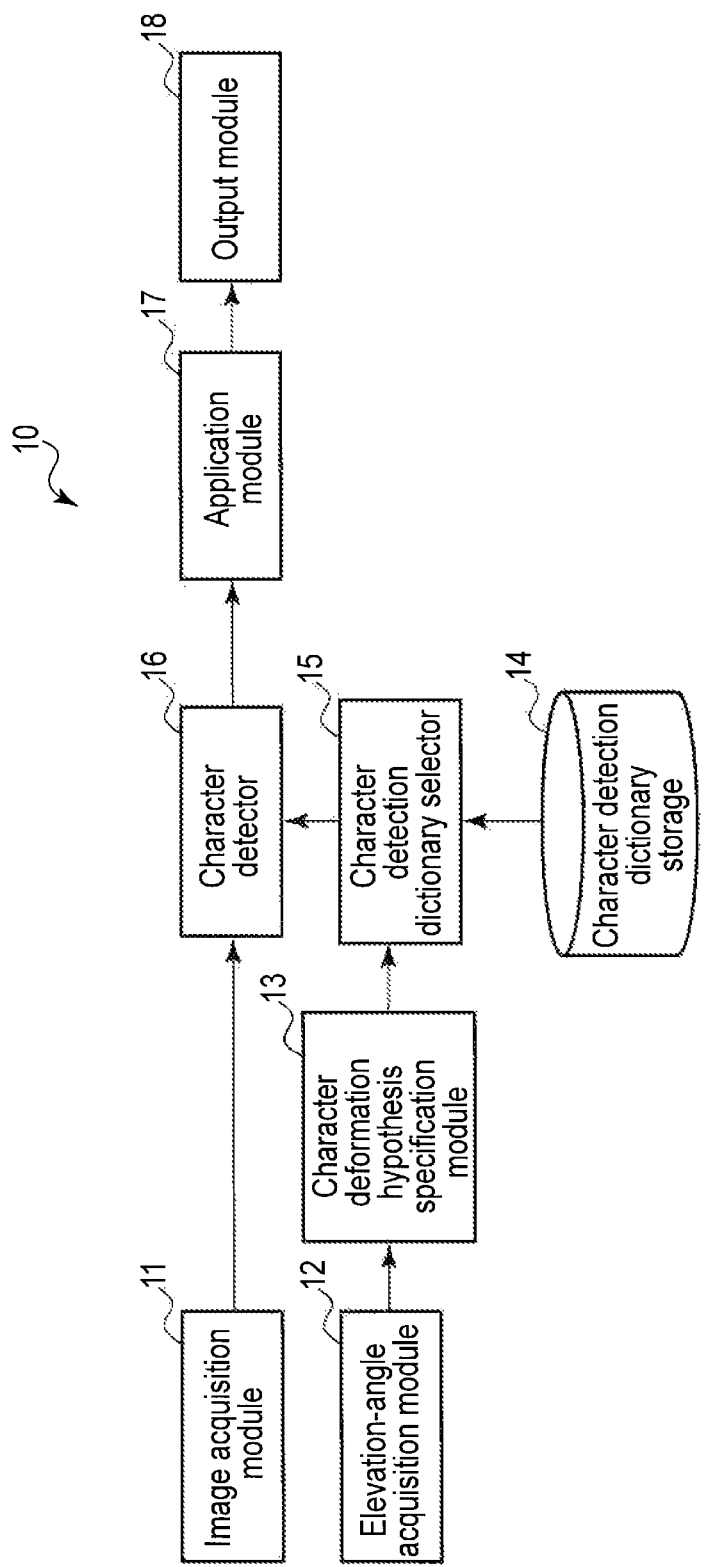
FIG. 3 is a block diagram showing an information processing apparatus according to an embodiment.

FIG. 3 is a block diagram showing a configuration example of the information processing apparatus according to the embodiment. As shown in FIG. 3, the information processing apparatus 10 includes an image acquisition module 11, an elevation-angle acquisition module 12, a character deformation hypothesis specification module 13, a character detection dictionary storage 14, a character detection dictionary selector 15, a character detector 16, an application module 17, and an output module 18. Referring now to FIGS. 4 to 9 as well as FIG. 3, the modules 11 to 18 will be described in detail.

The image acquisition module 11 has a function of acquiring an image obtained by a camera, and outputting the acquired image to the character detector 16. The elevation-angle acquisition module 12 has a function of acquiring the elevation angle of the camera assumed when the image acquired by the image acquisition module 11 was photographed, and outputting the acquired elevation angle to the character deformation hypothesis specification module 13.

Referring then to FIGS. 4 and 5, a detailed description will be given of a method employed in the camera for calculating the above-mentioned elevation angle.

FIG. 4 is a view defining a coordinate system unique to a device having a camera function, and rotational angles based on the coordinate system and indicating attitudes of the device. It is assumed that in a device 201 shown in FIG. 4, a pitch-axis x, where the right side of the device is set positive, and a roll-axis y perpendicular to the pitch-axis, where the upward side of the device is set positive, are defined beforehand. It is also assumed that a yaw-axis z, where the depth side of the device is set positive, is defined beforehand. In this case, the yaw-axis z is perpendicular to the pitch-axis x and the roll-axis y, and the pitch-axis x, the roll-axis y and the yaw-axis z provide three-dimensional coordinates of xyz for the device 201.

Thus, where the coordinate system xyz is defined, the attitude of the device 201 can be represented by rotational angles about the axes. Specifically, the rotational angle about the pitch-axis x is called a "pitch angle," and is denoted by "θ (theta)." Similarly, the rotational angle about the roll-axis y is called a "roll angle," and is denoted by "φ (phi)." The rotational angle about yaw-axis z is called a "yaw angle," and is denoted by "ψ (psi)." Namely, the attitude of the device 201 can be represented uniquely by the pitch angle θ, the roll angle φ and the yaw angle ψ.

The device 201 is supposed to include an image pickup module 202 provided on a surface of the apparatus 201 along the yaw-axis z, and to have an optical axis 203 adjusted substantially parallel to the yaw-axis z. Namely, if the vertical angle of the yaw-axis z with respect to the horizontal plane is computed, the elevation angle of the optical axis 203 is approximately computed.

The device 201 further includes a three-axis acceleration sensor 204 in addition to the above-described image pickup module 202. The acceleration sensor 204 outputs accelerations $A(x)$, $A(y)$ and $A(z)$ of the pitch-axis x, the roll-axis y and the yaw-axis z, respectively.

When the user aims the image pickup module 202 of the device 201 at a target of photography, with the apparatus kept still, the acceleration applied to the acceleration sensor 204 is only gravity. That is, the outputs $A(x)$, $A(y)$ and $A(z)$ of the acceleration sensor measured in this state can be regarded as the x-axis, y-axis and z-axis components of the gravitational acceleration G obtained by vector decomposition, respectively.

FIG. 5 is a side view of the device 201. As shown, the elevation angle β in the figure assumes a value of zero when the yaw-axis z is horizontal, assumes a positive value when the yaw-axis z is oriented upward, and assumes a negative value when the yaw-axis z is oriented downward. Further, the acceleration $A(z)$ as the z-axis component of the gravitational acceleration G assumes zero when the yaw-axis z is horizontal, assumes a negative value when the yaw-axis z is oriented upward, and assumes a positive value when the yaw-axis z is oriented downward. Namely, when the device 201 is stationary, the elevation angle β can be computed from the gravitational acceleration G and the acceleration $A(z)$, using the following equation (1):

$$\beta = \sin^{-1}(-A(z)/G) \quad (1)$$

The elevation-angle acquisition module 12 acquires the elevation angle computed as the above, and outputs it to the character deformation hypothesis specification module 13.

Returning again to FIG. 3, the character deformation hypothesis specification module 13 specifies which zone, described later, includes the elevation angle output from the elevation-angle acquisition module 12. If an elevation-angle zone is determined, the character deformation hypothesis specification module 13 can specify in which direction the target of photography when it was photographed, considering the above-described preconditions 1 and 2. Moreover, the character deformation hypothesis specification module 13 can predict how the appearance of the character (string) written on a sheet surface as the target of photography is deformed. In the embodiment, the result of the prediction is referred to as a "character deformation hypothesis." After predicting how the appearance of the character (string) is deformed, i.e., after deriving a character deformation hypothesis, the character deformation hypothesis specification module 13 outputs the derived character deformation hypothesis to the character detection dictionary selector 15.

Referring now to FIG. 6, the above-mentioned elevation-angle zone will be described in detail.

FIG. 6 is a view showing the relationship between the elevation-angle zone and the character deformation hypothesis The elevation-angle zone is used to specify in which direction the sheet surface of a photographic target exists, when viewed from the camera, thereby determining whether the sheet surface of the photographic target is substantially horizontal or vertical with respect to the ground. FIG. 6 shows a case where five elevation-angle zones A to E are defined.

For example, the elevation-angle zone A is a zone corresponding to a case where the elevation angle β satisfies "+80°<β≤+90°." If the elevation angle β output from the elevation-angle acquisition module 12 is included in the elevation-angle zone A, the character deformation hypothesis specification module 13 can determine that the sheet surface of the photographic target is a sheet surface 301 located just above the camera and substantially horizontal with respect to the ground. Similarly, the elevation-angle zone B is a zone corresponding to a case where the elevation angle β satisfies "+30°<β≤+80°." If the elevation angle β output from the elevation-angle acquisition module 12 is included in the elevation-angle zone B, the character deformation hypothesis specification module 13 can determine that the sheet surface of the photographic target is a sheet surface 302 located obliquely above the camera and substantially vertical with respect to the ground. Further, the elevation-angle zone C is a zone corresponding to a case where the elevation angle β satisfies "−30°<β≤+30°." If the elevation angle β output from the elevation-angle acquisition module 12 is included in the elevation-angle zone C, the character deformation hypothesis specification module 13 can determine that the sheet surface of the photographic target is a sheet surface 303 located in front of the camera and substantially vertical with respect to the ground. Furthermore, the elevation-angle zone D is a zone corresponding to a case where the elevation angle β satisfies "−80°<β≤−30°." If the elevation angle β output from the elevation-angle acquisition module 12 is included in the elevation-angle zone D, the character deformation hypothesis specification module 13 can determine that the sheet surface of the photographic target is a sheet surface 304 located obliquely below the camera and substantially vertical with respect to the ground. Moreover, the elevation-angle zone E is a zone corresponding to a case where the elevation angle β satisfies "−90°<β≤−80°." If the elevation angle β output from the elevation-angle acquisition module 12 is included in the elevation-angle zone E, the character deformation hypothesis specification module 13 can determine that the sheet surface of the photographic target is a sheet surface 305 located just below the camera and substantially horizontal with respect to the ground.

As shown in FIG. 6, character deformation hypotheses 401 to 405 are associated with the elevation-angle zones A to E, respectively. By determining which elevation-angle zone includes the elevation angle, the character deformation hypothesis specification module 13 can specify how the appearance of the character (string) written on a sheet surface as the target of photography is deformed (character deformation hypothesis).

For example, when the elevation angle β is included in the elevation-angle zone A or E, the photographer (user) can see the sheet surface 301 or 305 as a target of photography substantially from the front, and therefore the character deformation hypothesis specification module 13 can specify that the appearance of the character string exhibits a shape indicated by the character deformation hypothesis 401 or 405. In the embodiment, it is assumed that the sheet surface as the target of photography is printed with a character string "TEXT."

Further, when the elevation angle β is included in the elevation-angle zone B, the photographer can see a sheet surface 302 as a target of photography from an obliquely downward position and from right and left positions near the obliquely downward position, and therefore the character deformation hypothesis specification module 13 can determine that the character string exhibits appearances as indicated by the character deformation hypothesis 402 of FIG. 6 (i.e., determines that the character string is deformed). Similarly, when the elevation angle β is included in the elevation-angle zone C, the photographer can see a sheet surface 303 as a target of photography from a front position and from right and left positions near the front position, and therefore the character deformation hypothesis specification module 13 can determine that the character string exhibits appearances as indicated by the character deformation hypothesis 403 of FIG. 6. Yet further, when the elevation angle β is included in the elevation-angle zone D, the photographer can see a sheet surface 304 as a target of photography from an obliquely upward position and from right and left positions near the obliquely upward position, and therefore the character deformation hypothesis specification module 13 can determine that the character string exhibits appearances as indicated by the character deformation hypothesis 404 of FIG. 6.

Figure 7:
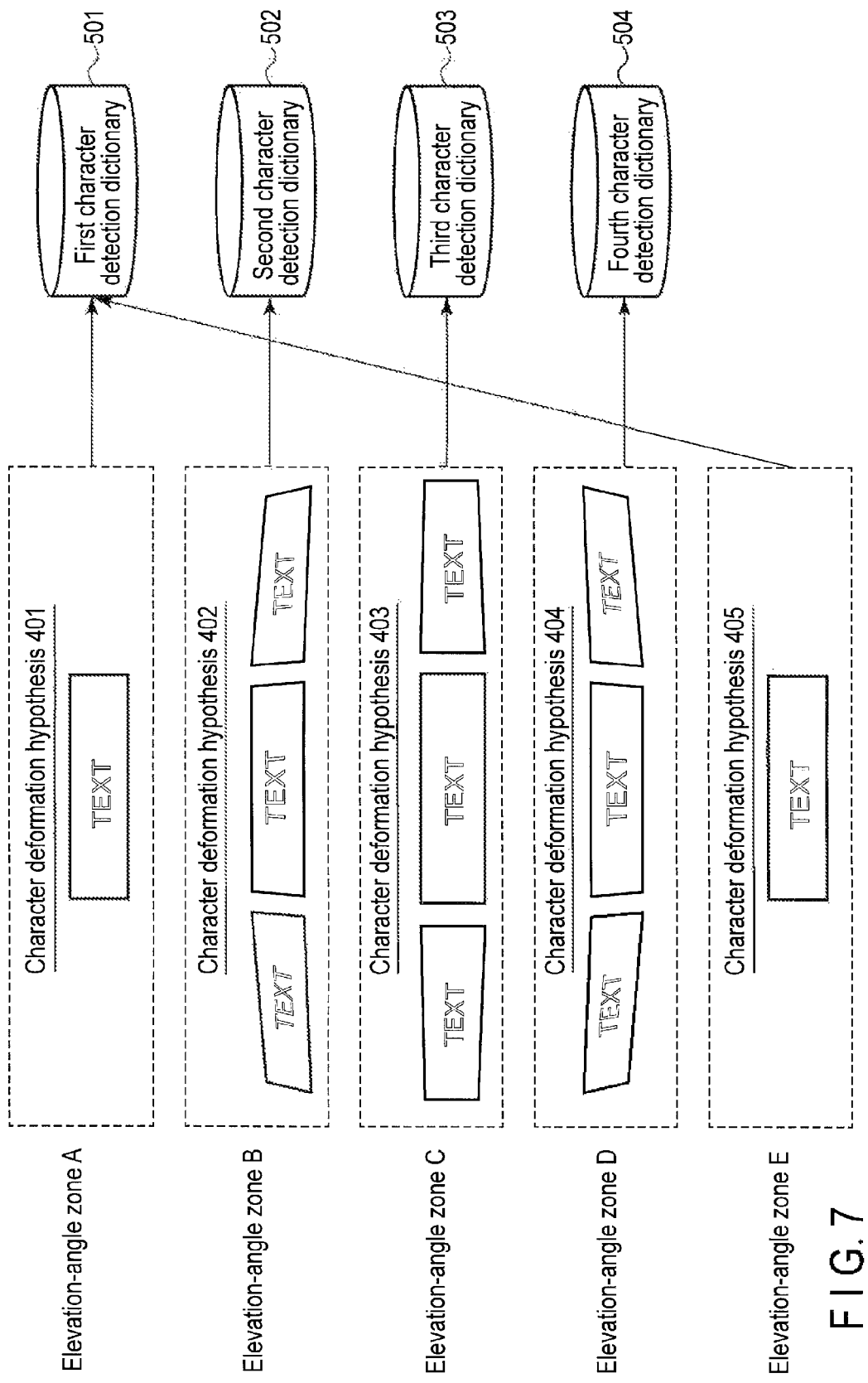
FIG. 7 is a view for explaining a character detection dictionary storage employed in the embodiment.

Returning again to FIG. 3, the character detection dictionary storage 14 is a device for storing a plurality of dictionaries (character detection dictionaries), used by the character detector 16, in association with character deformation hypotheses. More specifically, as shown in FIG. 7, the character detection dictionary storage 14 stores a number of dictionaries corresponding to the number of kinds of character deformation hypotheses, In FIG. 7, since the character deformation hypotheses 401 and 405 exhibit the same appearances, a description will be given of a case where four dictionaries 501 to 504 are stored in the character detection dictionary storage. 14. The dictionaries are used to estimate whether a partial image used during character detection processing is a character (string) or a non-character (string).

The character detection dictionary selector 15 has a function of selecting (acquiring), from the character detection dictionary storage 14, a dictionary corresponding to a character deformation hypothesis specified by the character deformation hypothesis specification module 13 The selected dictionary is output to the character detector 16.

The character detector 16 executes scale-reduction processing on an acquired image output from the image acquisition module 11, thereby generating a so-called resolution pyramid to search and detect a character string on the resolution pyramid.

Figure 8:
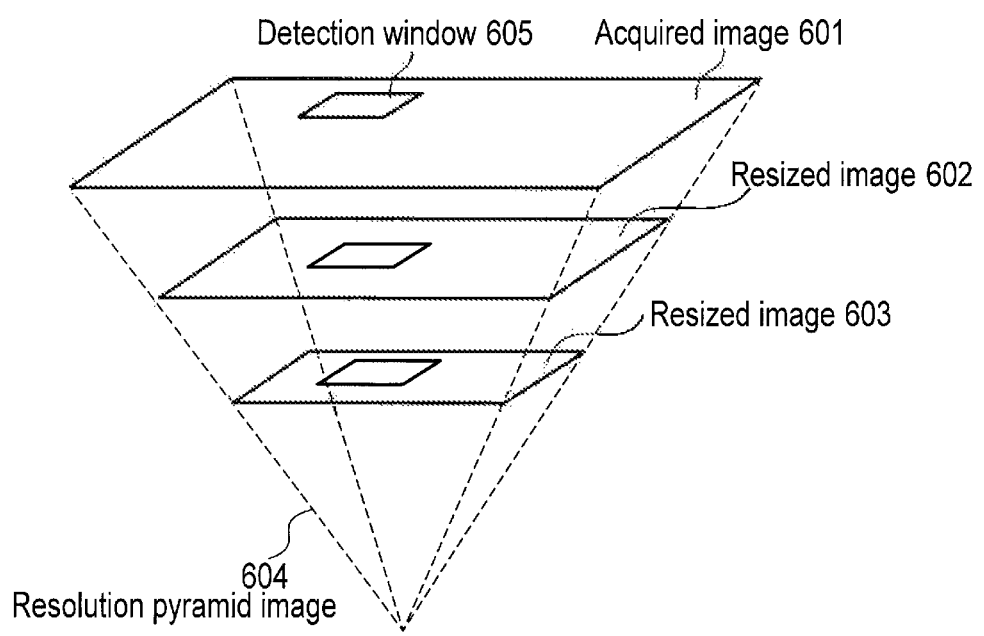
FIG. 8 is a view for explaining reduction processing executed by a character detector employed in the embodiment.
Figure 9:
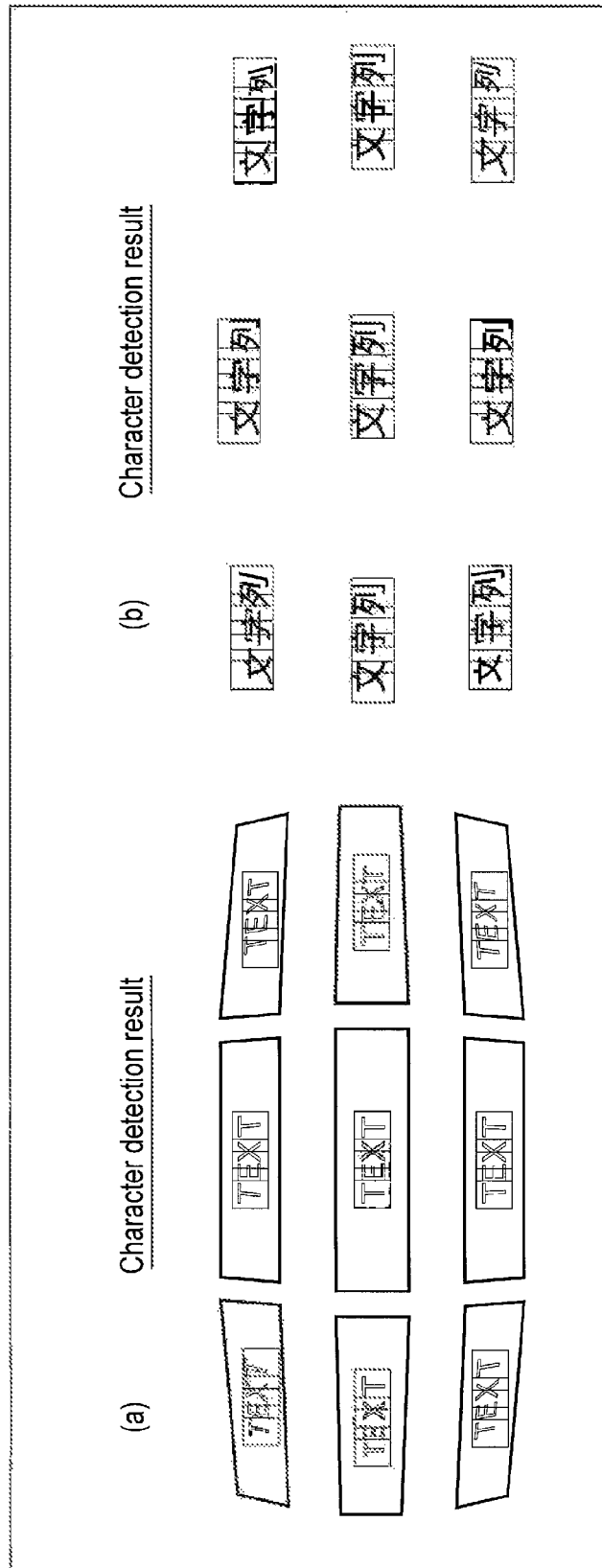
FIG. 9 is a view for explaining detection result data used in the embodiment.

Referring then to FIG. 8, the above-described scale-reduction processing will be described in detail.

FIG. 8 is a view for explaining the scale-reduction process performed by the character detector 16. As shown in FIG. 8, the character detector 16 sequentially reduces an acquired image 601 at a constant ratio r (0<r<1), thereby generating one or more resized images 602 and 603. The number of generated resized images, in other words, the number of times the above-mentioned reduction process is executed, depends upon the specified minimum size and maximum size of a character string to be detected. The size of a detection window 605 shown in FIG. 8 is determined in accordance with the size of a character string to be detected on the acquired image of the highest resolution. Namely, the size of the detection window 605 is the specified minimum size of the character string to be detected. On the resized images 602 and 603 reduced by multiplying the constant ratio r, the detection window 605 of a constant size is relatively large, and the size of the character string detected thereon is relatively large. The character detector 16 generates a resized image until the size of the character string exceeds its specified maximum size. Thus, after generating one or more resized images, the character detector 16 generates a resolution pyramid image 604 that includes the acquired image 601 and the resized images 602 and 603, as shown in FIG. 8.

After generating the resolution pyramid image, the character detector 16 generates a plurality of partial images by scanning the detection window 605 of the constant size on the respective images included in the generated resolution pyramid image and by cutting out images within the detection window 605 at respective positions. Further, the character detector 16 executes character detection processing, based on the thus-generated partial images and a dictionary selected by the character detection dictionary selector 15. More specifically, the character detector 16 compares each of the above-mentioned partial images and the selected dictionary, thereby calculating the score of each partial image indicating a character-likeness, and determining whether each score exceeds a predetermined threshold. As a result, it can be determined (evaluated) whether each partial image includes a character (string). In accordance with the result of the above-mentioned determination, the character detector 16 provides a first code indicating a character (string) to a partial image determined to be an image including the character, and provides a second code indicating a non-character to a partial image determined to be an image including no character (i.e., Including the non-character). Thus, the character detector 16 can detect, as a character-existing area, an area where a partial image provided with the first code exists (in other words, an area where a detection window cutting out the partial image with the first code is positioned). Detection result data indicating an area of the acquired image where a character (string) exists is output to the application module 17. The detection result data indicates the area of an acquired image where a character exists, using a rectangular frame, as is shown in, for example, FIG. 9(*a*) and FIG. 9(*b*).

A score calculation method of evaluating character-likeness of a partial image within the above-mentioned detection window can be realized utilizing a known pattern identification method, such as a partial space method and a support vector machine. Therefore, no detailed description is given thereof in the embodiment. It is assumed that the above-mentioned score is imparted to each detection window as detection result data.

The application module 17 executes processing corresponding to an application installed in advance, using the detection result data output from the character detection module 16. For example, when an application (for example, an application having an OCR function) capable of executing character recognition processing is installed in advance, the application module 17 extracts an image pattern of a character string, using an area where the character string indicated by the detection result data exists, and executes character recognition processing on the image pattern of the extracted character string, thereby acquiring a character code string corresponding to the character string in the area.

As a method of extracting the image pattern of a character string from data on a large number of detection windows that have different sizes and include character strings, a method is disclosed in, for example, a non-patent document, "A Hybrid Approach to Detect and Localize Texts in Natural Scene Images." In this method, "text confidence map" and "text scale map" are generated based on the position and score of a detection window obtained from "Text Region Detector," and a threshold for "3 values of Niblack" is determined by the latter, whereby an image is decomposed into connection components. Further, utilizing the former and other features, the connection components constituting characters are separated, and the neighbor relationship between the components is analyzed to thereby obtain a character string and an image pattern thereof. In the embodiment, the above-described detection result data, which includes a combination of a detection window and a score as an output of "Text Region Detector" described in the non-patent document, can be used.

Alternatively, an image may be subjected in advance to adaptive binarization and labeling to thereby obtain connection components, and an area where characters associated with the detection result data exist, is used as a mask in a simpler way, thereby extracting only connection components included in the mask, analyzing the neighbor relationship between the components to obtain a character string and an image pattern thereof.

If a character (string) in an image is recognized by OCR, the application module 17 can also retrieve data associated with an acquired character code sequence. More specifically, data, such as a price, specifications, can be retrieved from an article name, or map data can be obtained from a geographical name, the name of a beauty-spot, etc., in order to go there, or a certain language can be translated into another. Processing result data indicating the result of processing executed by the application module 17 is output to the output module 18.

The output module 18 has a function of presenting the processing result data from the application module 17 to a user via, for example, a display (not shown) incorporated in the information processing apparatus 10. The above-described application module 17 and output module 18 are functional parts provided to use the above-mentioned character detection processing result, and may be provided as a functional device separate from the information processing apparatus 10.

Referring then to the flowchart of FIG. 10, an operation example of the information processing apparatus 10 will be described briefly.

Firstly, the image acquisition module 11 acquires an image obtained by photography by a camera, and outputs the acquired image to the character detector 16 (step S1). Subsequently, the elevation-angle acquisition module 12 acquires data indicating the elevation angle of the camera assumed when the image was photographed, and outputs the data to the character deformation hypothesis specification module 13 (step S2).

Subsequently, the character deformation hypothesis specification module 13 specifies which elevation-angle zone includes the elevation angle acquired by the elevation angle acquisition module 12, and also specifies a character deformation hypothesis corresponding to the specified elevation-angle zone (step S3).

Subsequently, the character detection dictionary selector 15 selects, from the character detection dictionary storage 14, a dictionary corresponding to the character deformation hypothesis specified by the character deformation hypothesis specification module 13 (step S4). After that, the character detector 16 executes character detection processing using the image output from the image acquisition module 11, and the dictionary selected by the character detection dictionary selector 15 (step S5).

Subsequently, the application module 17 executes processing corresponding to each of various applications, using the result of the character detection processing executed by the character detector 16 (step S6), After that, the output module 18 presents the result of the processing performed by the application module 17 to the user (step S7), whereby the processing of information processing apparatus 10 is finished.

Figure 11:
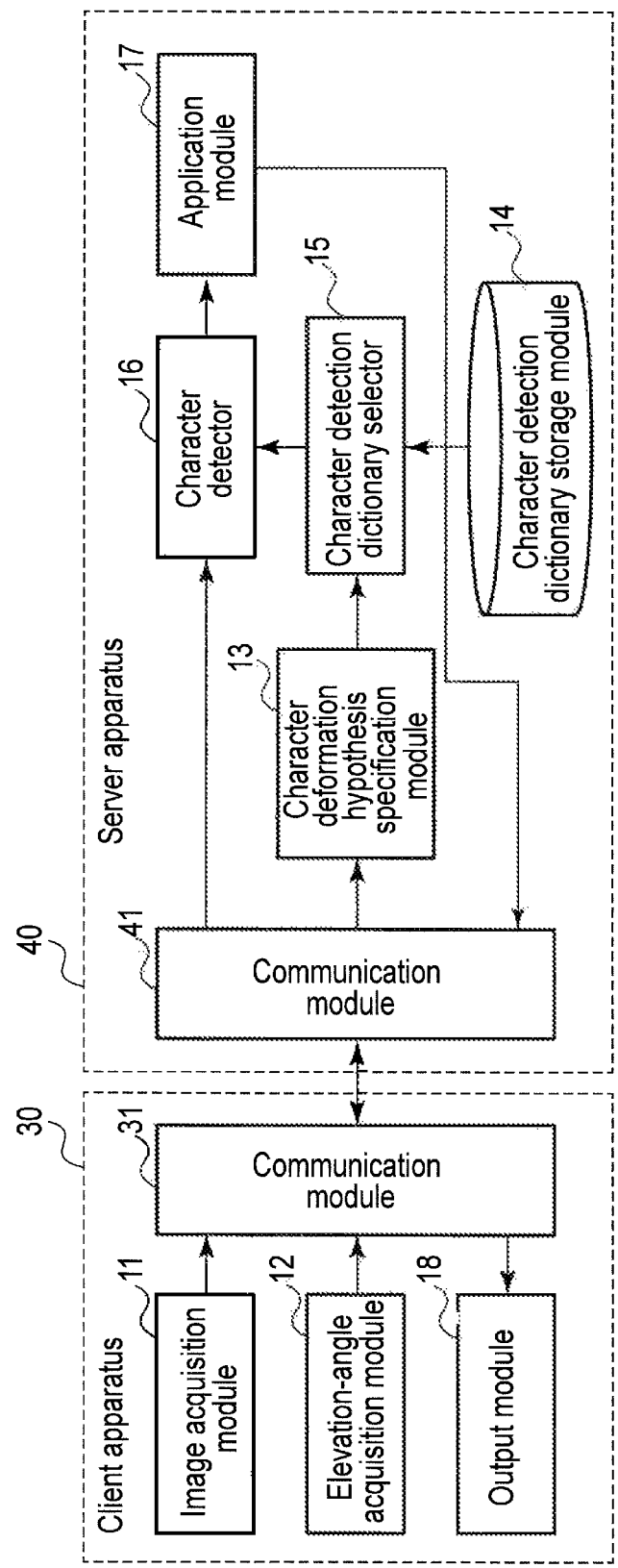
FIG. 11 is a block diagram showing a configuration example of an information processing system according to the embodiment.

Referring then to FIG. 11, a configuration example of the information processing system will be described.

FIG. 11 is a block diagram showing a configuration example of an information processing system including a client apparatus and a server apparatus into which various functions of the above-described information processing apparatus 10 are distributed. An information processing system 20 of FIG. 11 includes a client apparatus 30 and a server apparatus 40. As shown in FIG. 11, the client apparatus 30 includes a communication module 31, as well as the above-described image acquisition module 11, elevation-angle acquisition module 12 and output module 18. Further, as shown in FIG. 11, the server apparatus 40 includes a communication module 41, as well as the above-described character deformation hypothesis specification module 13, character detection dictionary storage 14, character detection dictionary selector 15, character detector 16, and application module 17.

The client apparatus 30 performs processing of outputting, to the server apparatus 40 via the communication module 31, the image acquired by the image acquisition module 11 and the elevation angle acquired by the elevation-angle acquisition module 12. Further, upon receipt of results of processing corresponding to various applications executed by the application module 17 in the server apparatus 40, the client apparatus 30 executes processing of presenting the results to the user.

Upon receipt of the acquired image and the elevation angle from the client apparatus 30 via the communication module 41, the server apparatus 40 executes character detection processing using the acquired image and the elevation angle. Using data acquired as a result of the above-mentioned character detection processing, the server apparatus 40 performs processing corresponding to various applications, and outputs data acquired as results of the processing to the client apparatus 30 via the communication module 41.

Figure 12:
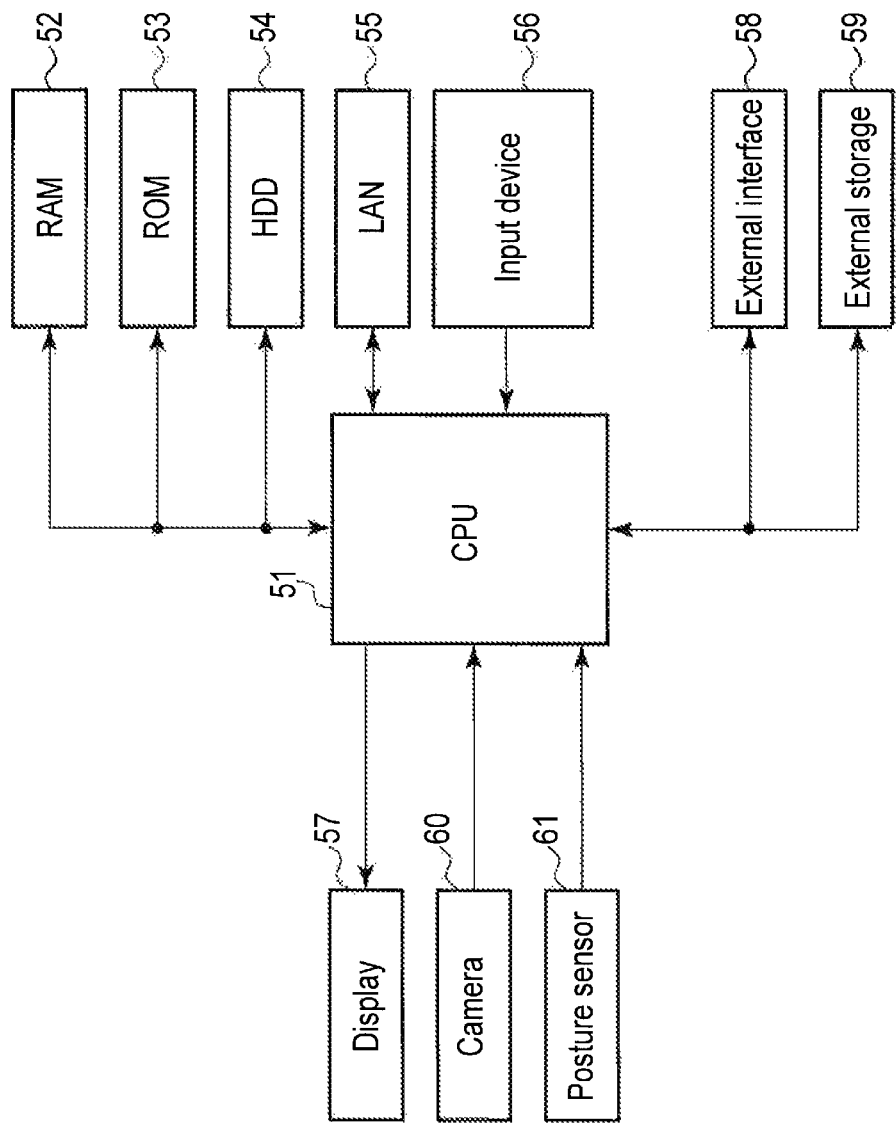
FIG. 12 is a block diagram showing a hardware configuration of the information processing apparatus of the embodiment.

Referring then to FIG. 12, a description will be given of a hardware configuration example of the information processing apparatus 10.

FIG. 12 shows the hardware configuration example of the information processing apparatus 10. The information processing apparatus 10 of FIG. 12 includes a CPU 51, a RAM 52, a ROM 53, an HDD 54, a LAN 55, input devices 56, a display 57, an external interface 58, an external storage device 59, a camera 60 and an attitude sensor 61.

The CPU 51 is a processor for controlling the components in the information processing apparatus 10. The CPU 51 executes a character detection program loaded into the RAM 52 from the HDD 54. By executing this character detection program, the CPU 51 can function as a processing part configured to execute the above-described character detection processing. The CPU 51 can load a character detection program from the external storage devices 59 (for example, a USB device) into the RAM 52, thereby executing it. From the external storage device 59, not only the character detection program, but also data indicating an image used during character detection processing and indicating an elevation angle, can be loaded.

The input devices 56 are a keyboard, a mouse, a touchpanel, and other various input devices. The display 57 is a device capable of displaying results of various types of processing executed in the information processing apparatus 10.

The camera 60 is a device capable of providing an image that can serve as a target of character detection processing. The attitude sensor 61 is a device capable of acquiring the elevation angle of the camera 60.

In the above-described embodiment, two preconditions 1 and 2 associated with the camera attitude are assumed to exist. The precondition 2 may be replaced with the precondition 2' described below:

(Precondition 2') It is assumed that the user sets up the camera by controlling its swing rotation so that a character (string) in an image will not rotate as far as possible, in addition to controlling the tilt rotation and the pan rotation. As a result, the character (string) in the image obtained by photography becomes substantially horizontal.

Even if the precondition 2 is replaced with the precondition 2', the information processing apparatus 10 can perform character detection processing substantially the same as the above-described character detection processing, although in this case, part of the character deformation hypothesis needs to be replaced with a character deformation hypothesis indicating that the character string exhibits a horizontal appearance.

Moreover, although in the embodiment, the information processing apparatus 10 executes character detection processing using only the elevation angle, it may execute it, further using the swing rotational angle. In the latter case, it can be determined that the greater the absolute value of the swing rotation, the greater the inclination of the character string in the image. This can provide a more delicate character deformation hypothesis, and hence can reduce the number of dictionaries required for character detection processing. As a result, the time required for the character detection processing can be reduced.

Figure 13:
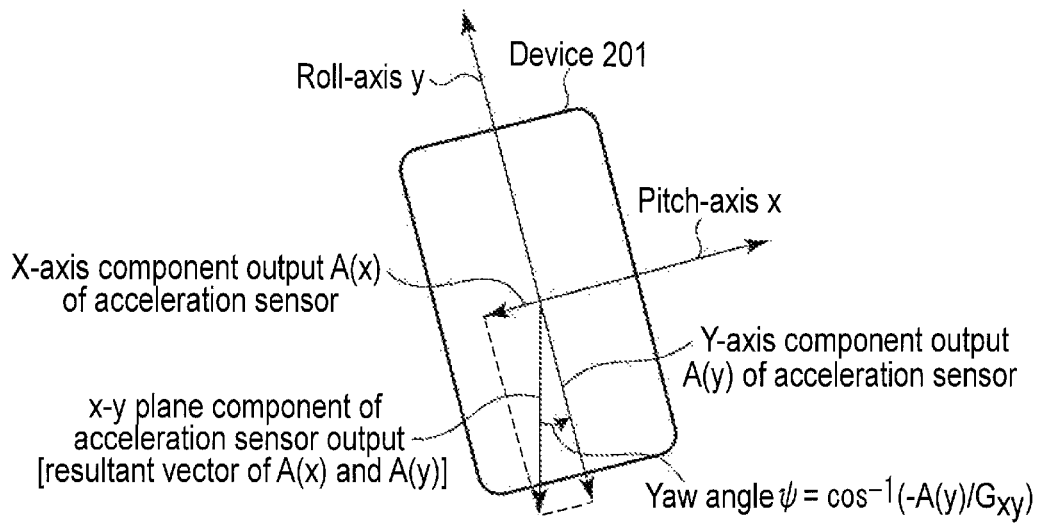
FIG. 13 is a view for explaining a method of calculating a swing rotational angle.

Referring to FIG. 13, a method, for use in the camera, of calculating the above-mentioned swing rotational angle will be described supplementarily. In the description below, elements similar to those shown in FIGS. 4 and 5 are denoted by corresponding reference numbers, and no detailed description will be given thereof.

In general, the origins and directions of the rotational angles $\theta$, $\phi$ and $\psi$ can be defined arbitrarily. It is assumed here that the pitch angle $\theta$ and the roll angle $\phi$ are set to zero (origin) when the device 201 is placed horizontally, namely, when the yaw-axis z is vertical, and that a direction in which the upper edge of the device 201 is raised (i.e., the clockwise rotation about the pitch-axis x) is set to the positive direction of the pitch angle $\theta$, and a direction in which the right-hand edge of the device 201 is raised (i.e., the counterclockwise rotation about the roll-axis y) is set to the positive direction of the roll angle $\phi$. Similarly, it is assumed that the yaw angle $\psi$ is set to zero (origin) when the elevation angle is zero, i.e., when the yaw-axis z is horizontal and the pitch-axis x is horizontal (in other words, the roll-axis y is vertical), and that the counterclockwise direction about the yaw-axis z is the positive direction of the yaw angle $\psi$.

It is further assumed that both the horizontal and vertical axes of the image-pickup surface of the image pickup module 202 are substantially parallel to the pitch-axis x and roll-axis y. Namely, the swing rotational angle can be approximately calculated by calculating the yaw angle ψ.

Rotation about the yaw-axis z is rotation in the xy plane of the device 201. That is, as shown in FIG. 13, the yaw angle ψ of the device 201, i.e., the swing rotational angle of the image pickup surface, can be approximately calculated from the accelerations A(x) and A(y). Neither of the x-axis component A(x) and y-axis component A(y) associated with the gravitational acceleration G is set to zero unless the yaw-axis z is parallel to the gravitational acceleration G. Accordingly, the length Gxy of the resultant vector of A(x) and A(y), given by the following equation (2), does not becomes zero, either.

$$G_{xy} = \sqrt{A(x)^2 + A(y)^2} \quad (2)$$

In this case, the yaw angle ψ is given by the following conditional expressions (3). When Gxy is zero, the yaw angle ψ is regarded as zero for facilitating the description.

$$\varphi = \cos^{-1}(-A(y)/G_{xy}) \text{ when } G_{xy} > 0$$

$$\varphi = 0 \text{ when } G_{xy} = 0 \quad (3)$$

Since the above-described embodiment is constructed such that a character deformation hypothesis pre-defined from the elevation angle of the camera is specified, and character detection processing is executed using a dictionary corresponding to the specified character deformation hypothesis, it can overcome the above-mentioned problems, namely, limitation on the types of frames, reduction of the collation accuracy of a dictionary, and excess collation time. As a result, a character (string) in an image can be reliably (efficiently and accurately) detected.

Modifications will now be described.

(Modification 1)

Although the above-described embodiment is directed to the case where five character deformation hypotheses 401 to 405 corresponding to elevation-angle zones A to E, respectively, are defined as the character deformation hypothesis, the number of defined character deformation hypotheses may not be one in each elevation-angle zone. The appearance of a character (string) can be classified into nine types, because the character (string) exhibits the same appearance when it is viewed from just above, from just below and from the front, as is shown in FIG. 6. Therefore, each of the nine character appearances may be defined as a character deformation hypothesis.

Figure 14:
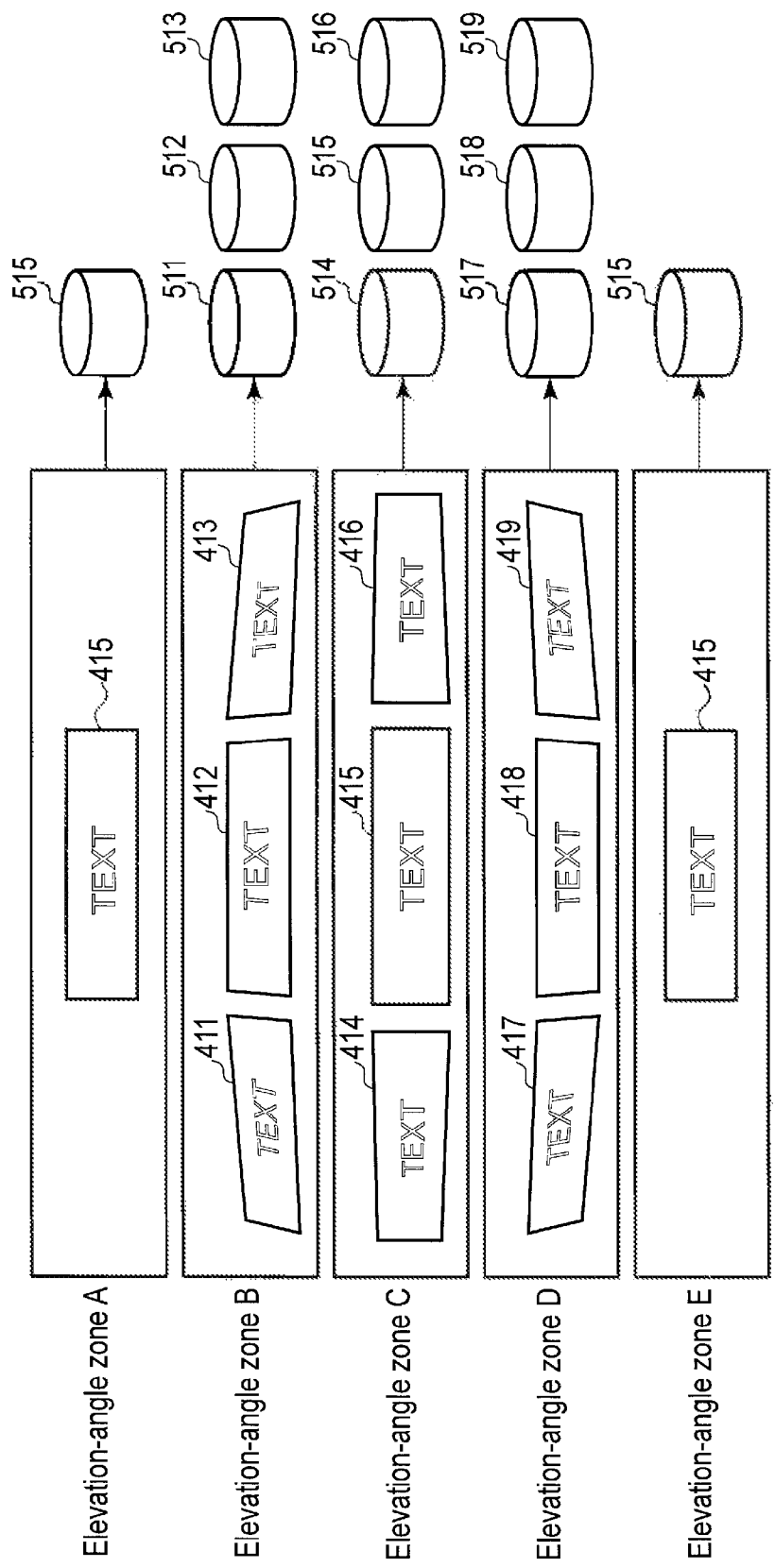
FIG. 14 is a view for explaining a deformation of the information processing apparatus of the embodiment.

In this case, as shown in FIG. 14, the elevation-angle zone A is associated with one character deformation hypothesis 415, the elevation-angle zone B is associated with three character deformation hypotheses 411 to 413, the elevation-angle zone C is associated with three character deformation hypotheses 414 to 416, the elevation-angle zone D is associated with three character deformation hypotheses 417 to 419, and the elevation-angle zone E is associated with one character deformation hypothesis 415. Furthermore, since the character detection dictionary storage 14 stores dictionaries classified in accordance with the number of character deformation hypotheses, it stores dictionaries 511 to 519 corresponding to the character deformation hypotheses 411 to 419 as shown in FIG. 14.

(Modification 2)

Although the above-described embodiment is directed to the case where the five zones A to E are defined as elevation-angle zones corresponding to elevation angles acquired by the elevation-angle acquisition module 12, the number of elevation-angle zones is not limited to five. For example, four new elevation-angle zones may be additionally defined at the boundaries between the elevation-angle zones A to E.

Figure 15:
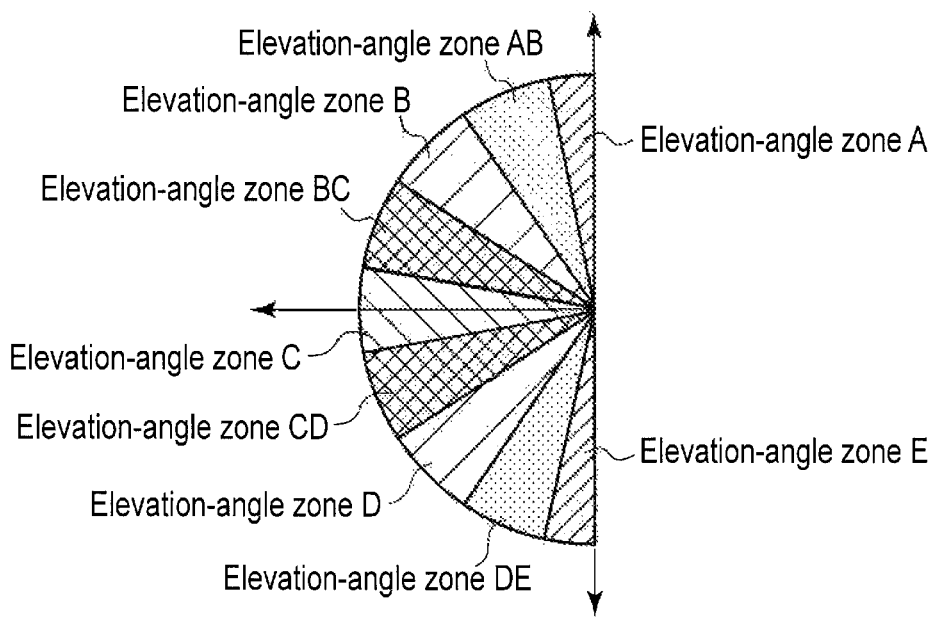
FIG. 15 is a view for explaining another deformation of the information processing apparatus of the embodiment.

Specifically, as shown in FIG. 15, a new elevation-angle zone AB is specifically defined between the elevation-angle zones A and B, a new elevation-angle zone BC may be defined between the elevation-angle zones B and C, a new elevation-angle zone CD may be defined between the elevation-angle zones C and D, and a new elevation-angle zone DE may be defined between the elevation-angle zones D and E. When nine elevation-angle zones are defined as shown in FIG. 15, the correspondence relationship between each elevation-angle zone and an elevation angle is, for example, as follows: The elevation-angle zone A is a zone corresponding to "+85°<β≤+90°." The elevation-angle zone AB is a zone corresponding to "+60°<β≤+85°." The elevation-angle zone B is a zone corresponding to "+40°<β≤+60°." The elevation-angle zone BC is a zone corresponding to "+10°<β≤+40°." The elevation-angle zone C is a zone corresponding to "−10°<β≤+10°." The elevation-angle zone CD is a zone corresponding to "−40°<β≤−10°." The elevation-angle zone D is a zone corresponding to "−60°<β≤−40°." The elevation-angle zone DE is a zone corresponding to "−85°<β≤−60°." The elevation-angle zone E is a zone corresponding to "−90°<β≤−85°."

If an elevation angle acquired by the elevation-angle acquisition module 12 is included in an elevation-angle zone newly defined at a boundary, the character deformation hypothesis specification module 13 specifies a plurality of character deformation hypotheses. For example, assume a case where nine elevation-angle zones are defined as described above, and nine character deformation hypotheses are defined as in modification 1. Under this assumption, if the elevation angle is included in the elevation-angle zone AB, the character deformation hypothesis specification module 13 specifies the character deformation hypotheses 411 to 413 and 415 corresponding to the elevation-angle zones A and B. Similarly, if the elevation angle is included in the elevation-angle zone BC, the character deformation hypothesis specification module 13 specifies the character deformation hypotheses 411 to 416 corresponding to the elevation-angle zones B and C. If the elevation angle is included in the elevation-angle zone CD, the character deformation hypothesis specification module 13 specifies the character deformation hypotheses 414 to 419 corresponding to the elevation-angle zones C and D. If the elevation angle is included in the elevation-angle zone DE, the character deformation hypothesis specification module 13 specifies the character deformation hypotheses 415 and 417 to 419 corresponding to the elevation-angle zones D and E.

By virtue of the above structure, if the elevation angle is included in the elevation-angle zone AB, the character detection dictionary selector 15 can select the dictionaries 511 to 513 and 515 associated with the character deformation hypotheses 411 to 413 and 415 corresponding to the elevation-angle zones A and B, as is shown in FIG. 16. Similarly, if the elevation angle is included in the elevation-angle zone BC, the character detection dictionary selector 15 can select the dictionaries 511 to 516 associated with the character deformation hypotheses 411 to 416 respectively corresponding to the elevation-angle zones B and C. Further, if the elevation angle is included in the elevation-angle zone CD, the character detection dictionary selector 15 can select the dictionaries 514 to 519 associated with the character deformation hypotheses 414 to 419 corresponding to the elevation-angle zones C and D. Yet further, if the elevation angle is included in the elevation-angle zone DE, the character detection dictionary selector 15 can select the dictionaries 515 and 517 to 519 associated with the character deformation hypotheses 415 and 417 to 419 corresponding to the elevation-angle zones D and E.

By virtue of the above structure, the information processing apparatus 10 can assume character deformation hypotheses more precisely, which enhances the character detection accuracy.

In addition, since various types of processing in the embodiment can be realized by a computer program, an advantage similar to that of the embodiment can be obtained simply by installing the computer program in a computer through a computer-readable storage medium storing the computer program, and executing the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a hardware processor programmed to:
   acquire an image obtained by photographing a sheet surface printed with a character;
   acquire an elevation angle of a photographic device assumed when the photographic device has obtained the acquired image;
   specify how an appearance of the character in the acquired image is deformed, based on the acquired elevation angle;
   store a plurality of character detection dictionaries associated with variously deformed appearances of the character;
   select one of the character detection dictionaries after it is specified how the appearance of the character is deformed, the one character detection dictionary being associated with the specified appearance of the character; and
   execute character detection processing on the acquired image to detect an area of the character in the acquired image, using the selected character detection dictionary.

2. The apparatus of claim 1, wherein the hardware processor is programmed to specify how the appearance of the character is deformed, by specifying which one of a plurality of pre-defined elevation-angle zones includes the acquired elevation angle.

3. The apparatus of claim 2, wherein the plurality of pre-defined elevation-angle zones include a first elevation-angle zone corresponding to a sheet surface positioned just above the photographic device, a second elevation-angle zone corresponding to a sheet surface positioned obliquely above the photographic device, a third elevation-angle zone corresponding to a sheet surface positioned in front of the photographic device, a fourth elevation-angle zone corresponding to a sheet surface positioned obliquely below the photographic device, and a fifth elevation-angle zone corresponding to a sheet surface positioned just below the photographic device.

4. An information processing system comprising a client apparatus and a server apparatus,
wherein the server apparatus comprises a hardware processor programmed to:
   acquire an image obtained by photographing a sheet surface printed with a character;
   acquire an elevation angle of the client apparatus assumed when the client apparatus has obtained the acquired image;
   specify how an appearance of the character in the acquired image is deformed, based on the acquired elevation angle;
   store a plurality of character detection dictionaries associated with variously deformed appearances of the character;
   select one of the character detection dictionaries after it is specified how the appearance of the character is deformed, the one character detection dictionary being associated with the specified appearance of the character; and
   execute character detection processing on the acquired image to detect an area of the character in the acquired image, using the selected character detection dictionary.

5. An information processing method executed by an information processing apparatus provided with a character detection dictionary storage configured to store a plurality of character detection dictionaries associated with variously deformed appearances of a character, the method comprising:
   acquiring an image obtained by photographing a sheet surface printed with a character;
   acquiring an elevation angle of a photographic device assumed when the photographic device has obtained the acquired image;
   specifying how an appearance of the character in the acquired image is deformed, based on the acquired elevation angle;
   selecting, after it is specified how the appearance of the character is deformed, one of the character detection dictionaries from the character detection dictionary storage, the one character detection dictionary being associated with the specified appearance of the character; and
   executing character detection processing on the acquired image to detect an area of the character in the acquired image, using the selected character detection dictionary.

* * * * *